United States Patent
Kulkarni et al.

(10) Patent No.: US 11,271,957 B2
(45) Date of Patent: Mar. 8, 2022

(54) CONTEXTUAL ANOMALY DETECTION ACROSS ASSETS

(71) Applicant: International Business Machines Corporation, Armonk, NY (US)

(72) Inventors: Kedar Kulkarni, Bangalore (IN); Padmanabha Venkatagiri Seshadri, Mysore (IN); Sumanta Mukherjee, Bangalore (IN); Satyam Dwivedi, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 367 days.

(21) Appl. No.: 16/526,359

(22) Filed: Jul. 30, 2019

(65) Prior Publication Data

US 2021/0037031 A1  Feb. 4, 2021

(51) Int. Cl.
*H04L 29/06* (2006.01)
*G06F 17/18* (2006.01)
*G06N 20/00* (2019.01)

(52) U.S. Cl.
CPC .......... *H04L 63/1425* (2013.01); *G06F 17/18* (2013.01); *H04L 63/1441* (2013.01); *G06N 20/00* (2019.01)

(58) Field of Classification Search
CPC ............ H04L 63/1425; H04L 63/1441; H04L 63/1416; H04L 63/1433; H04L 43/067; H04L 63/14; H04L 43/062; H04L 43/08; G06F 17/18
See application file for complete search history.

(56) References Cited

U.S. PATENT DOCUMENTS

| | | | |
|---|---|---|---|
| 7,191,073 B2 | 3/2007 | Astley et al. | |
| 7,639,714 B2 | 12/2009 | Stolfo et al. | |
| 7,853,433 B2 | 12/2010 | He et al. | |
| 9,075,713 B2 | 7/2015 | Jones et al. | |
| 9,218,232 B2 | 12/2015 | Khalastchi et al. | |

(Continued)

OTHER PUBLICATIONS

Harpale, Abhay et al., A Textual Transform of Multivariate Time-Series for Prognostics; arXiv:1709.06669; Cornell University Library; Sep. 19, 2017.

(Continued)

*Primary Examiner* — Ali S Abyaneh
(74) *Attorney, Agent, or Firm* — Ryan, Mason & Lewis, LLP

(57) ABSTRACT

Methods, systems, and computer program products for contextual anomaly detection across assets are provided herein. A method includes obtaining time-series data frames corresponding to assets; clustering the assets into one or more cohorts based on the time-series data frames, each cohort comprising assets having statistically similar time-series data frames; for each given asset within each cohort: applying a time-context window to the portion of the time-series data frames corresponding to the given asset to generate at least one transformed data frame, and determining an asset distribution for the given asset based on the at least one transformed data frame; determining one or more of that at least one of the assets within at least one of the cohorts is anomalous and that at least one of the cohorts is anomalous; and causing at least one remediation action to be performed based on the determining.

20 Claims, 9 Drawing Sheets

(56) References Cited

U.S. PATENT DOCUMENTS

| | | | |
|---|---|---|---|
| 9,727,821 | B2 | 8/2017 | Lin et al. |
| 9,787,705 | B1 | 10/2017 | Love et al. |
| 10,587,633 | B2 | 3/2020 | Muddu et al. |
| 2012/0041575 | A1 | 2/2012 | Maeda et al. |
| 2013/0282336 | A1 | 10/2013 | Maeda et al. |
| 2014/0172866 | A1* | 6/2014 | Lin .................. G06F 16/2477 707/741 |
| 2016/0117502 | A1 | 4/2016 | Reed et al. |
| 2017/0028593 | A1 | 2/2017 | Maruyama |
| 2017/0284896 | A1 | 8/2017 | Harpale et al. |
| 2018/0219888 | A1 | 8/2018 | Apostolopoulos |
| 2018/0220314 | A1 | 8/2018 | Chen et al. |
| 2018/0367551 | A1 | 12/2018 | Muddu et al. |
| 2019/0095266 | A1 | 3/2019 | Chen et al. |
| 2019/0243872 | A1 | 8/2019 | Komatsu et al. |
| 2019/0310635 | A1 | 10/2019 | Hazard et al. |
| 2019/0312898 | A1* | 10/2019 | Verma .................. G06N 3/084 |
| 2020/0005096 | A1 | 1/2020 | Calmon et al. |
| 2020/0082013 | A1 | 3/2020 | Triplet et al. |
| 2020/0099709 | A1 | 3/2020 | Vasseur et al. |
| 2020/0120122 | A1* | 4/2020 | Du .................. H04W 4/70 |
| 2020/0162503 | A1 | 5/2020 | Shurtleff et al. |
| 2020/0167787 | A1 | 5/2020 | Kursun |
| 2020/0204576 | A1* | 6/2020 | Davis .................. H04L 63/1425 |
| 2020/0285997 | A1 | 9/2020 | Bhattacharyya et al. |
| 2020/0287914 | A1 | 9/2020 | Swanson et al. |
| 2020/0336499 | A1 | 10/2020 | Kulkarni et al. |
| 2020/0380129 | A1 | 12/2020 | Dawson et al. |
| 2021/0049477 | A1 | 2/2021 | Sakae et al. |
| 2021/0124983 | A1 | 4/2021 | Axenie et al. |

OTHER PUBLICATIONS

Steemwinckel, Bram et al., Towards Adaptive Anomaly Detection and Root Cause Analysis by Automated Extraction of Knowledge from Risk Analyses, Proceedings of the 9th International Semantic Sensor Networks Workshop co-located with 17th International Semantic Web Conference (ISWC 2018), Monterey, CA, United States, Oct. 9, 2018.

Jayarajah, Kasthuri et al., Discovering anomalous events from urban informatics data, Proceedings of SPIE: 8th Ground/Air Multisensor Interoperability, Integration, and Networking for Persistent ISR, 10190, Anaheim, United States, Apr. 10-13, 2017.

Idé, Tsuyoshi et al., Multi-task Multi-modal Models for Collective Anomaly Detection, 2017 IEEE International Conference on Data Mining (ICDM), New Orleans, LA, 2017, Nov. 18-21, 2017, pp. 177-186.

Idé, Tsuyoshi et al.; Change detection using directional statistics, In Proceedings of the Twenty-Fifth International Joint Conference on Artificial Intelligence (IJCAI'16), Gerhard Brewka (Ed.). AAAI Press, Jul. 9, 2016.

Ahmad, Subutai et al., Unsupervised Real-Time Anomaly Detection for Streaming Data, Neurocomputing, vol. 262, Jun. 2, 2017, pp. 134-147, ISSN 0925-2312.

Konishi,, Tatsuya et al., CityProphet: city-scale irregularity prediction using transit app logs. In Proceedings of the 2016 ACM International Joint Conference on Pervasive and Ubiquitous Computing (UbiComp '16). ACM, New York, NY, USA, Sep. 12, 2016, pp. 752-757.

Alzantot, Moustafa et al., Sensegen: A deep learning architecture for synthetic sensor data generation, In 2017 IEEE International Conference on Pervasive Computing and Communications Workshops (PerCom Workshops), pp. 188-193. IEEE, 2017.

Giridhar, Prasanna et al., ClariSense+: An enhanced traffic anomaly explanation service using social network feeds, Pervasive and Mobile Computing, vol. 33, Dec. 2016 (available online Apr. 6, 2016), pp. 140-155, ISSN 1574-1192.

Zhang, C. et al., A Deep Neural Network for Unsupervised Anomaly Detection and Diagnosis in Multivariate Time Series Data, arXiv preprint arXiv:1811.08055, Nov. 20, 2018.

Urosevic, V. et al., Temporal clustering for behavior variation and anomaly detection from data acquired through IoT in smart cities, Recent Applications in Data Clustering. IntechOpen, Aug. 1, 2018.

List of IBM Patents or Patent Applications Treated as Related, dated Jul. 30, 2019.

* cited by examiner

CONTEXTUAL ANOMALY DETECTION ACROSS ASSETS

FIELD

The present application generally relates to information technology and, more particularly, to detecting anomalies across assets based on time-series data.

BACKGROUND

Internet of things (IoT) refers to a network of devices that include, for example, electronics, software, sensors, actuators, and connectivity that allows these things to connect, interact, and exchange data. There is an increasing number of applications of IoT in consumer, commercial, industrial and infrastructure spaces. IoT applications will often rely on many assets (for example, sensor devices) and it is often difficult to detect anomalies across such assets, thereby leading to increased costs to remediate such anomalies and inefficiencies in the IoT system.

SUMMARY

In one embodiment of the present invention, techniques for contextual anomaly detection across assets are provided. An exemplary computer-implemented method includes obtaining time-series data frames corresponding to a plurality of assets; clustering the assets into one or more cohorts based on the time-series data frames, wherein each one of the cohorts comprises assets having statistically similar time-series data frames; for each given one of the assets within each one of the cohorts: (i) applying a time-context window to the portion of the time-series data frames corresponding to the given asset to generate at least one transformed data frame, and (ii) determining an asset distribution for the given asset based at least in part on the at least one transformed data frame; determining one or more of (i) that at least one of the assets within at least one of the cohorts is anomalous and (ii) that at least one of the cohorts is anomalous; and causing at least one remediation action to be performed based at least in part on the determining.

In another embodiment of the invention, an exemplary computer-implemented method includes obtaining time-series data frames corresponding to a plurality of assets; performing coarse clustering of the time-series data frames to identifying one or more cohorts of assets, wherein each one of the cohorts comprises assets having statistically similar time-series data frames; transforming the time-series data frame of each of the assets within each of cohorts such that each data point in the time-series data frame is associated with a neighborhood context; extracting statistical properties from the transformed time-series data frame for each of the assets; determining, based at least in part on the extracted statistical properties, one or more of (i) that at least one of the assets within at least one of the cohorts is anomalous and (ii) that at least one of the cohorts is anomalous; and causing at least one remediation action to be performed based on the determining.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
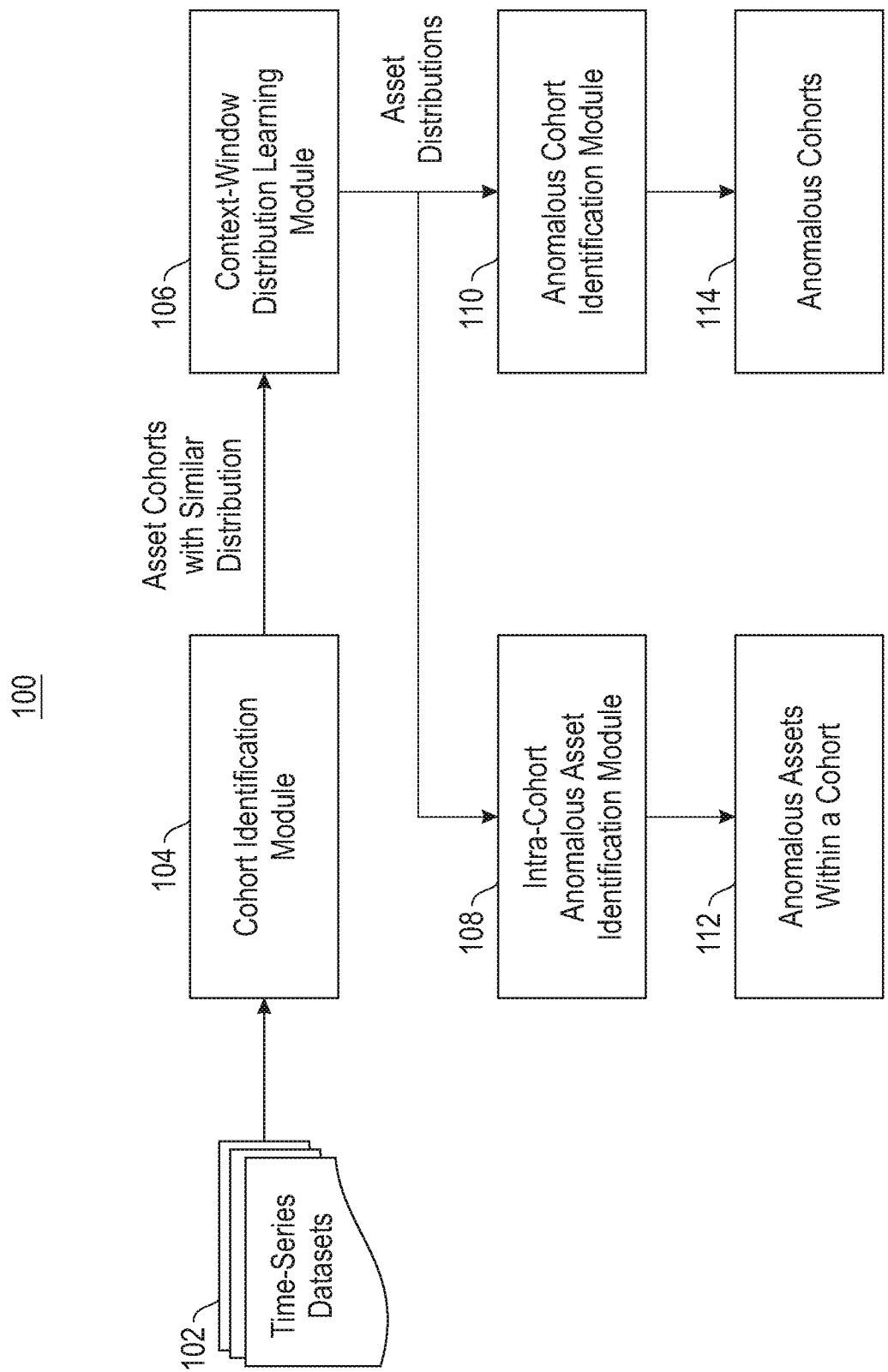
FIG. 1 is a diagram illustrating a system architecture according to an exemplary embodiment of the invention.

Existing techniques for anomaly detection rely on supervised machine learning techniques, thus requiring data that are labeled a priori, and generally rely on distributional methods that fail to capture the temporal structure of time-series data when detecting anomalies. These disadvantages lead to inefficiencies in detecting and remediating problems with assets (e.g., IoT assets).

The example embodiments herein describe techniques for rapid unsupervised anomaly comparison across multiple assets in a fleet by accounting for the temporal context of their multi-variate data. One or more example embodiments of the subject matter described herein account for temporal continuity that assists in identifying temporal context anomalies.

Exemplary embodiments leverage the following concepts: (i) time-series segmentation techniques, such as time-based clustering (i.e., clustering over time) and variable value based clustering, for example; (ii) graphical Gaussian modeling to learn statistical distribution of multivariate time-series data; (iii) unsupervised graph clustering techniques (such as, for example, spin-glass, hierarchical, PAM clustering) to cluster segments of a time-series dataset; and (iv) Sparse Mixture of Sparse Gaussians (SMSG), which has the advantage of representing a set of signals in terms of a dictionary of Gaussians. The number and type of Gaussians within the dictionary may be determined using, for example, the techniques described in *Multi-task Multi-modal Models for Collective Anomaly Detection* by Idé et al. in the 2017 *IEEE International Conference on Data Mining (ICDM)*, pp. 177-186. IEEE, 2017, which is incorporated by reference herein. If each signal is represented using this dictionary, then any variation in a data point within one of the signals will result in the corresponding signal to stand out as an outlier with respect to the other signals.

At least one example embodiment utilizes "coarse" clustering to create asset cohorts (also referred to as 'clusters') which have a similar data distribution, and then performs a transformation of asset time-series data to capture temporal context and continuity. The coarse clustering may include, for example, clustering based on only the data points in the time series data while ignoring the associated timestamps. Temporal-context-aware graph clustering ("fine clustering") is then computed on the assets.

According to at least one embodiment, contextual anomaly detection includes a step of coarse grained clustering of assets to identify cohorts using a light-weight method (such as, for example, fitting a unimodal multi-variate Gaussian using the full data frame for each asset, followed by application of a distance metric such as KL-divergence between assets). Next, context-window distribution learning is performed by transforming data (e.g., data frame) for each asset within a given cohort so that a neighborhood context is associated with each data point. The statistical properties of the transformed data frame are extracted for the asset, such as by fitting a distribution constructed using SMSG dictionary for that cohort, for example. This allows temporal context anomalies to be detected, which may not otherwise manifest as distributional differences. Intra-cohort anomalous assets and anomalous cohorts may then be identified.

Turning now to FIG. 1, this figure shows a block diagram illustrating a system architecture according to an exemplary embodiment of the invention. The system architecture includes a cohort identification module 104, a context-window distribution learning module 106, anomalous cohort identification module 108, and an intra-cohort anomalous asset identification module 110.

The cohort identification module 104 obtains one or more time-series data frames 102 corresponding to a plurality of assets. The data frame includes timestamped rows, wherein each row includes fields having values corresponding to asset variables (e.g., sensor variables). There is one time-series data frame for every asset, and all of the data for each of the assets are used as a single frame. The cohort identification module 104 applies a multi-variate Gaussian distribution to each frame. The cohort identification module 104 then computes the distance between assets. The distance between assets i and j is calculated based on the following distance function:

$$d(J_{i,j}) = e^{-\left(\frac{J_{i,j}}{\lambda}\right)},$$

where $\lambda$ is a constant, and where $J_{i,j}=J(\mu_i, \Sigma_i)\|(\mu_j, \Sigma_j))$ is the Jenson-Shannon co-efficient between distributions of assets i and j.

The cohort identification module 104 then applies graph clustering techniques (such as spin-glass clustering, for example) to identify clusters (i.e., assets with similar distribution).

Figure 2:
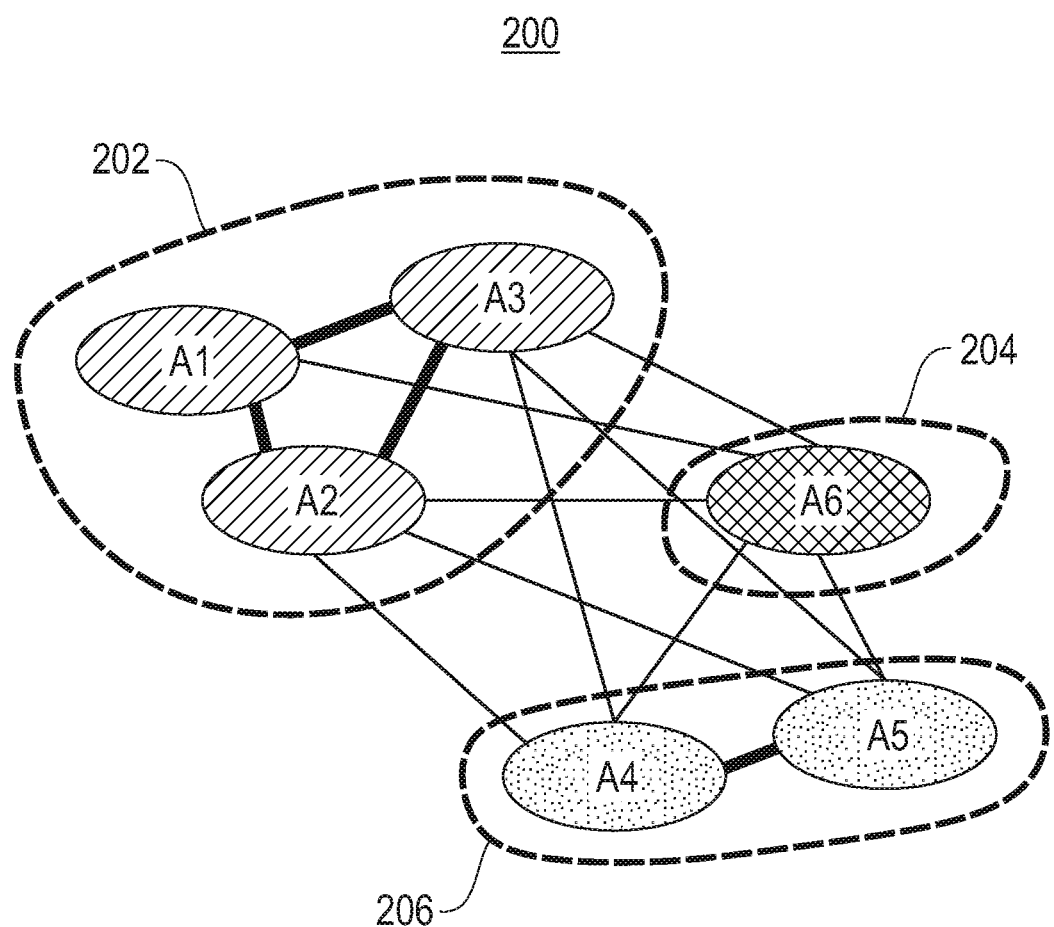
FIG. 2 is a diagram illustrating an asset graph in accordance with exemplary embodiments.

FIG. 2 shows a graph 200 representing clusters of assets in accordance with example embodiments. The graph 200 represents, for example, the clusters identified by the cohort identification module 104. The graph 200 includes three clusters 202, 204, and 206. In the example shown in FIG. 2, cluster 202 includes three assets (A1, A2, and A3), cluster 204 includes one asset (A6), and cluster 206 includes two assets (A4 and A5). The edges between the assets correspond to the calculated distances.

Figure 3:
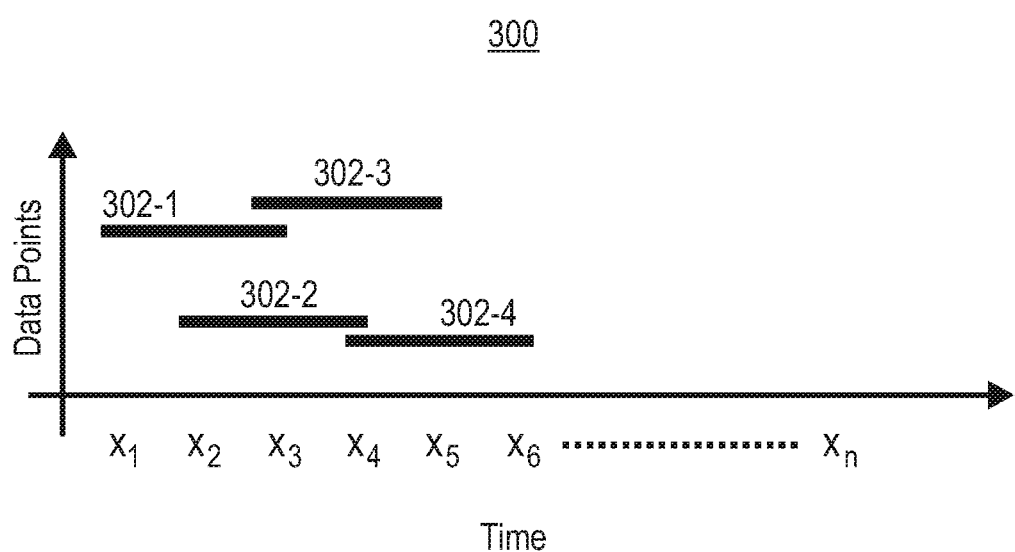
FIG. 3 is a diagram illustrating context window segments in accordance with exemplary embodiments.

Referring again to FIG. 1, the context-window distribution learning module 106 obtains the clusters identified by the cluster identification module. For each asset within a given cluster, the context-window distribution learning module 106 applies a context window on the data as shown in FIG. 3, for example. The graph 300 shown in FIG. 3 includes data points (i.e., samples $x_1$ to $x_n$). In this example, transformed samples 302-1, 302-2, 302-3, 302-4 include original samples $x_1, x_2, x_3; x_2, x_3, x_4; x_3, x_4, x_5;$ and $x_4, x_5, x_6$, respectively. In other words, each transformed sample has a context window size of three such that every data point $x_i$ is captured along with the context $x_{i-1}$ and $x_{i+1}$.

The context-window distribution learning module 106 then extracts temporal-context aware asset distribution. In particular, each transformed sample (e.g., transformed samples 302-1, 302-2, 302-3, 302-4) is treated as a multi-variate data point. Thus, a distribution may be fit using the transformed asset data frame. In this example, context-window distribution learning module 106 uses an SMSG distribution, wherein each cohort $C_i$ is represented by the Gaussian dictionary $G_s=\{(\mu_s, \Sigma_s)\|s \in \{1, 2 \ldots N\}$ and N is number of Gaussians$\}$, wherein $G_s$ is the s-th Gaussian function, $\mu_s$ is the s-th mean, and $\Sigma_s$ is the s-th covariance matrix. Thus, the assets belonging to the cohort have Gaussians derived from $G_i$. It is to be appreciated that in other embodiments a different type of distribution could be used, such as a simple Gaussian distribution, for example. The context-window distribution learning module 106.

The intra-cohort anomalous asset identification module 108 obtains the asset distributions generated by the context-window distribution learning module 106 and constructs a graph similar to graph 200, except the edge weights are represented using the distances obtained from the SMSG based asset distributions using the distance function described above. In other embodiments, the edge weights could be obtained from any other suitable form of distribution fitting. Within each cohort, the intra-cohort anomalous asset identification module 108 computes the isolation metric for an asset, which is then thresholded to obtain anomalous assets within a given cohort 112. The isolation metric for an asset 'i' within a cohort is calculated using the following equation:

$$\text{Isolation}(i, It) = \begin{cases} 1, & \frac{d_i - \mu_{-i}}{\sigma_{-i}} \geq I_t \\ 0, & \text{otherwise} \end{cases}$$

wherein $(\mu_{-i}, \sigma_{-i})$ are the leave 'i' out mean and standard deviation over all asset/cohort-pair distances (excepting pairs including 'i') within the graph, $I_t$ is the Isolation Threshold, and $d_i$ is the average distance between 'i' and all other assets/cohorts.

Figure 4:
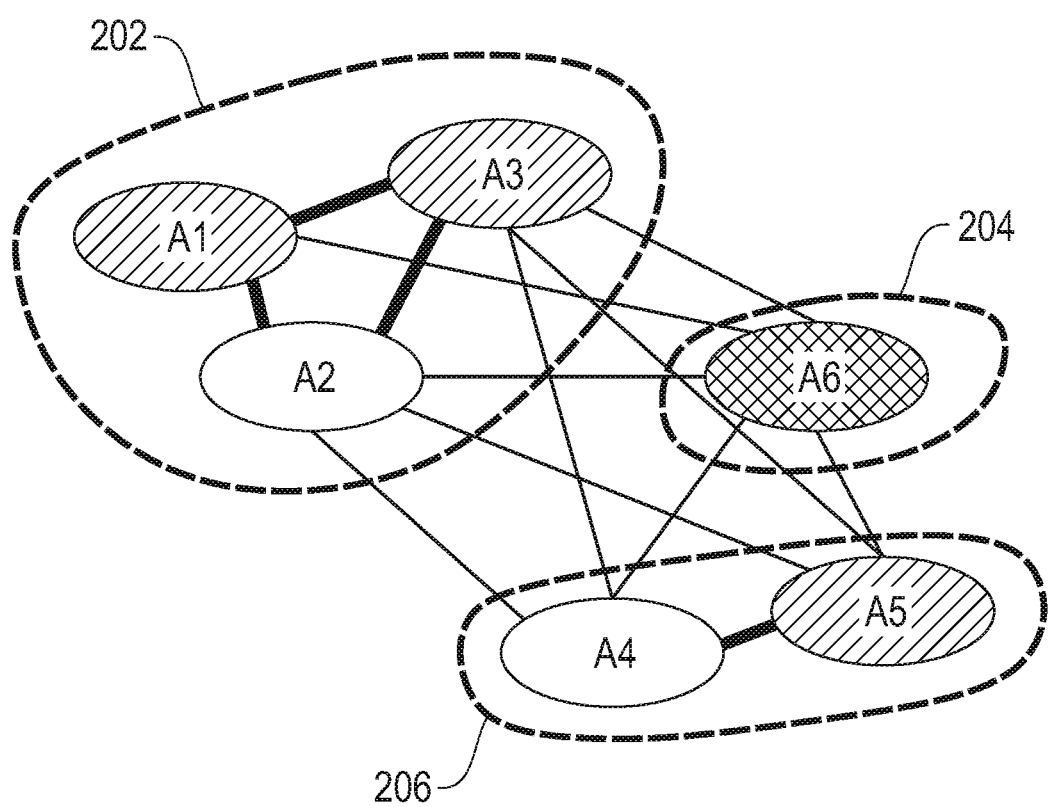
FIG. 4 is an asset graph that includes intra-cohort anomalous assets in accordance with exemplary embodiments.

FIG. 4 shows a graph corresponding to graph 200 from FIG. 2 with certain assets that are marked as anomalous in accordance with example embodiments. The graph shown in FIG. 4 represents, for example, the anomalous assets identified by the intra-cohort anomalous asset identification module 108 for different clusters. As can be seen from FIG.

4, asset A2 in cluster 202 and asset A4 in cluster A4 are marked as being anomalous assets with the respective cohorts 202 and 206.

The anomalous cohort identification module 110 identifies anomalous cohorts 114 by computing a distance for the cohorts and applying an isolation metric (for example, in a similar manner as described above with respect to intra-cohort anomalous asset identification module 108 describe above, for example). The distance for the cohorts may be computed by constructing a cohort graph based on the following cohort distance function:

$$CohortDistance(i, j) = e^{-\left(\frac{\bar{J}_{i,j}}{\beta}\right)}$$

wherein $\beta$ is a constant, and wherein:

$$\bar{J}_{i,j} = \frac{\sum_{(\mu_{i,l},\sum_{i,l})\in G_i} \sum_{(\mu_{j,k},\sum_{j,k})\in G_j} J\left(\left(\mu_{i,l},\sum_{i,l}\right) \| \left(\mu_{j,k},\sum_{j,k}\right)\right)}{|G_i| \times |G_j|}$$

wherein $J_{ij}$ is the Jensen-Shannon coefficient that represents the distance between a pair of distributions i and j, and $G_i$ and $G_j$ are Gaussians.

For the SMSG embodiment, the isolation metric equation is applied to compute the isolation metric for a given cohort, which is then thresholded to obtain one or more anomalous cohorts 114. If the embodiment involves some other distribution fit (such as, for example, Gaussians), then the average of all edge weights of nodes of a cohort pair may be used to identify cohort anomalies. Other embodiments may include weighted distances wherein weights could be derived from the asset distributions, or using all-pairs asset distances for identifying anomalous cohorts.

Figure 5:
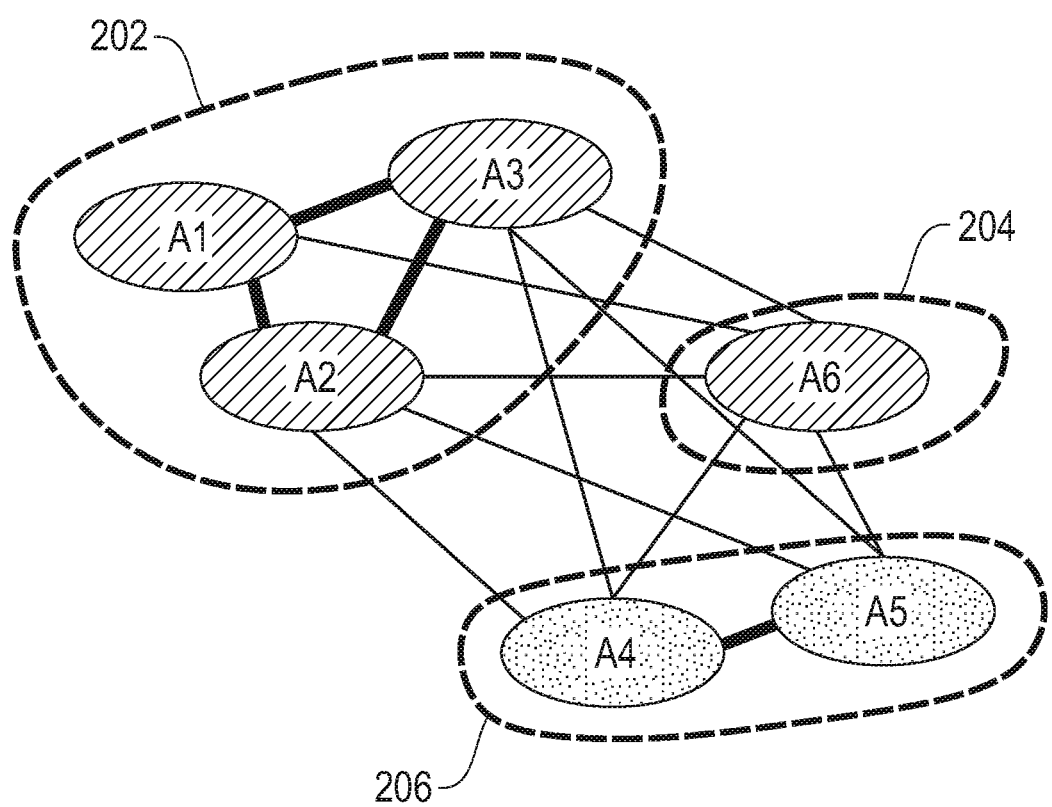
FIG. 5 is an asset graph that includes an anomalous cohort in accordance with exemplary embodiments.

FIG. 5 shows a graph corresponding to graph 200 from FIG. 2 with a cohort that is marked as anomalous in accordance with example embodiments. The graph shown in FIG. 5 represents, for example, the anomalous cohorts identified by the anomalous cohort identification module 110. In the example shown in FIG. 5, cohort 204 is marked as anomalous.

As such, the system architecture shown in FIG. 1 allows identification of one or more of:
1. Anomalous assets within a cohort. These anomalous assets correspond to assets that do not conform to trends of the cohort behavior. As a non-limiting example, a batch of smart meters deployed in a typical middle-class locality are expected to report energy consumptions in-and-around the typical range of energy consumption for middle-class houses. A smart meter indicating very high energy consumption within this group may be due to energy being misused by the customer, such as, for commercial purposes, for example.
2. Anomalous cohort of assets. As a non-limiting example, if smart meters within a given area are reporting frequent energy disruptions, then this locality may be experiencing an energy distribution infrastructure malfunction.

Figure 6:
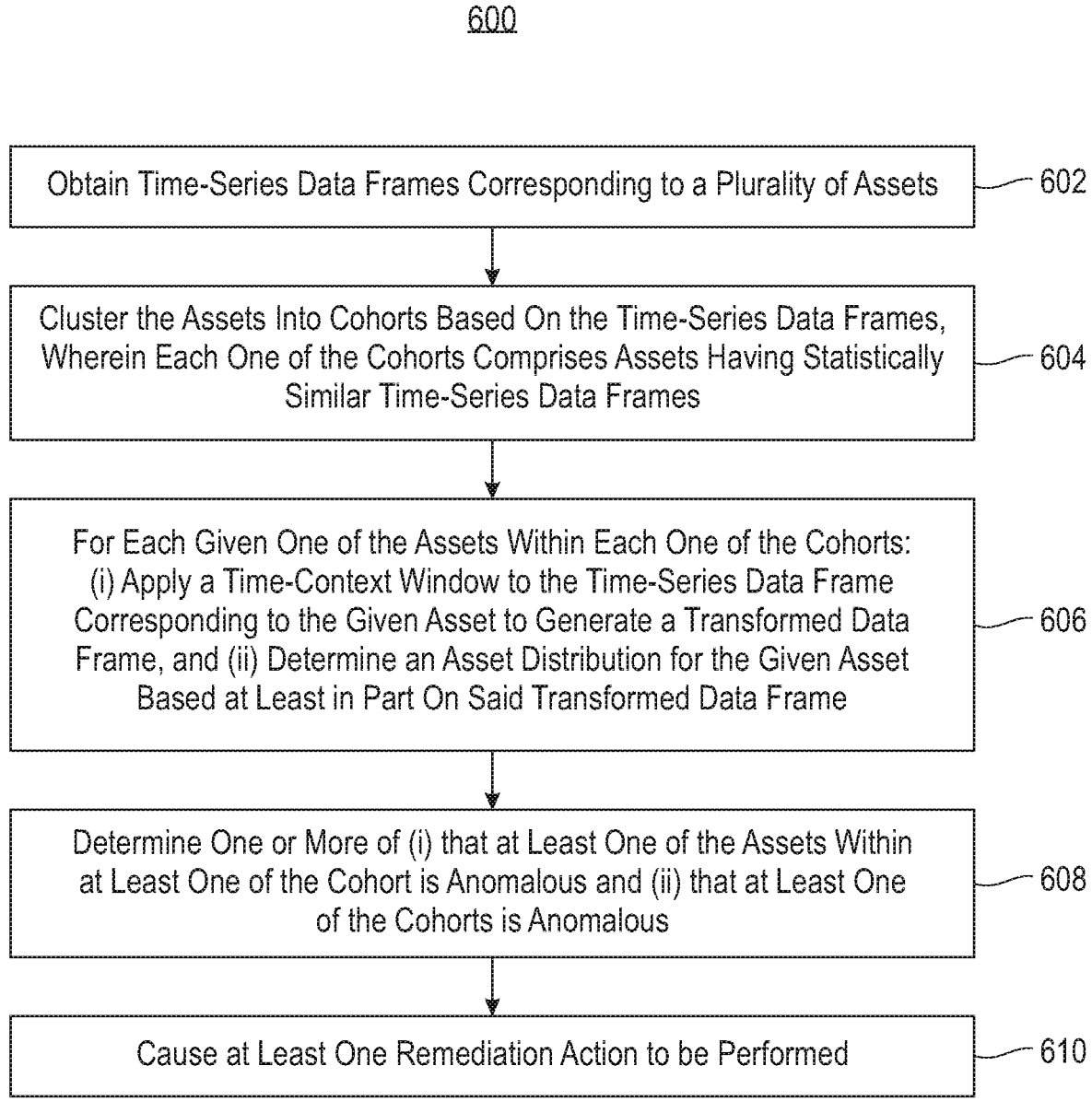
FIG. 6 is a flow diagram illustrating techniques according to an exemplary embodiment of the invention.

FIG. 6 is a flow diagram illustrating techniques according to an embodiment of the present invention. Step 602 includes obtaining time-series data frames corresponding to a plurality of assets. Step 604 includes clustering the assets into one or more cohorts based on the time-series data frames, wherein each one of the cohorts comprises assets having statistically similar time-series data frames.

Step 606 includes, for each given one of the assets within each one of the cohorts: (i) applying a time-context window to the portion of the time-series data frames corresponding to the given asset to generate at least one transformed data frame, and (ii) determining an asset distribution for the given asset based at least in part on said at least one transformed data frame.

Step 608 includes determining one or more of (i) that at least one of the assets within at least one of the cohorts is anomalous and (ii) that at least one of the cohorts is anomalous. Step 610 includes causing at least one remediation action to be performed based at least in part on said determining.

The clustering of step 604 may include applying an unsupervised clustering algorithm to the time-series data frames.

Determining the asset distribution for the given asset in step 606 may include applying a sparse mixture of sparse Gaussians (SMSG) to the at least one transformed data frame for the given asset.

Determining the asset distribution for the given asset in step 606 may include applying a Gaussian distribution to the transformed data frame for the given asset.

Determining that at least one of the assets within at least one of the cohorts is anomalous in step 608 may include: computing an isolation metric for each of the assets within the at least one of the cohorts based on the corresponding asset distributions, and determining that the at least one of the assets is anomalous in response to the computed isolation metric satisfying a predetermined threshold.

Determining that at least one of the cohorts is anomalous in step 608 may include: computing an isolation metric for each one of the cohorts based at least in part on the corresponding asset distributions, and determining that the at least one of the cohorts is anomalous in response to the computed isolation metric satisfying a predetermined threshold. The determining that at least one of the cohorts is anomalous may include: computing a Gaussian dictionary for each one of the cohorts, wherein each of the Gaussian dictionaries comprises the asset distributions of the assets corresponding to the cohort, and averaging all pairs of asset distributions between the assets distributions in the Gaussian dictionary corresponding to a first one of the cohorts and the asset distributions in the Gaussian dictionary corresponding to a second one of the cohorts.

The time-series data frames may include (i) time-stamps and (ii) sensor values for the plurality of assets.

The at least one remediation action may include one or more of: outputting a list of the anomalous assets to a user; outputting a list of the anomalous cohorts to a user; disabling the at least one asset; resetting the at least one asset; and adjusting future data frames obtained from one or more of the anomalous assets and the anomalous cohorts.

The plurality of assets may include at least a part of one or more of: (i) a heating system, (ii) a ventilation system, (iii) a cooling system, and (iv) a turbine system.

Also, an additional embodiment of the invention includes obtaining time-series data frames corresponding to a plurality of assets; performing coarse clustering of the time-series data frames to identifying one or more cohorts of assets, wherein each one of the cohorts comprises assets having statistically similar time-series data frames; transforming the time-series data frame of each of the assets within each of cohorts such that each data point in the time-series data frame is associated with a neighborhood context; extracting statistical properties from the transformed time-series data frame for each of the assets; determining, based at least in part on the extracted statistical properties, one or more of (i) that at least one of the assets within at least one of the cohorts is anomalous and (ii) that at least one of the cohorts is anomalous; and causing at least one remediation action to be performed based on said determining.

The techniques depicted in FIG. 6 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 6 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 7:
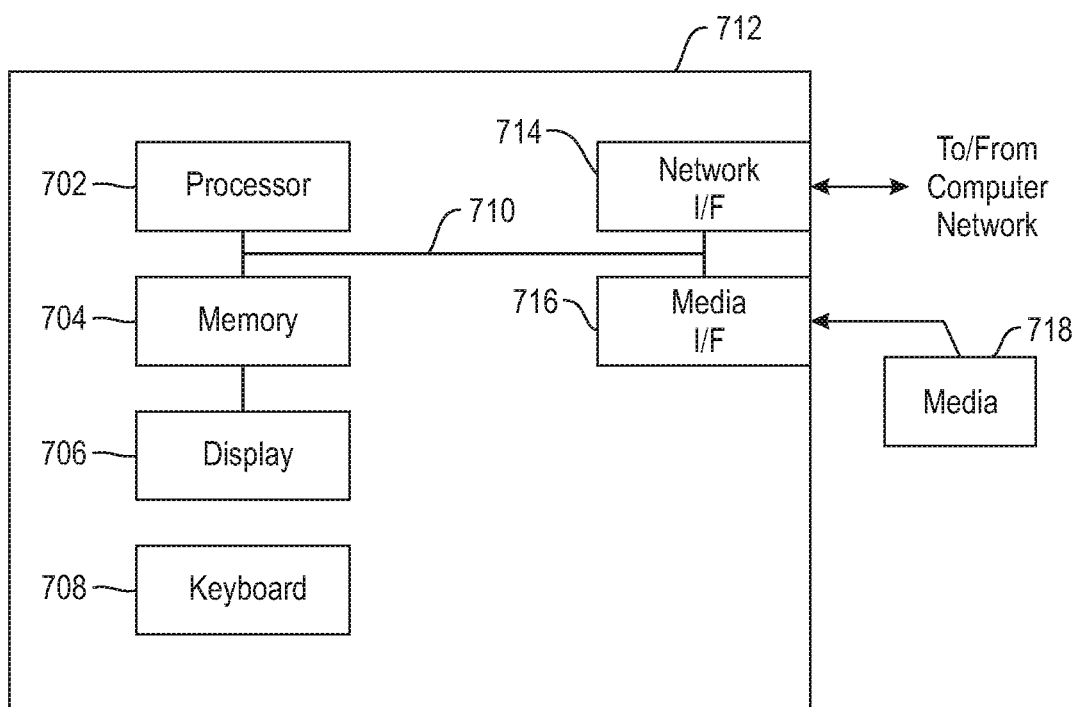
FIG. 7 is a system diagram of an exemplary computer system on which at least one embodiment of the invention can be implemented.

Additionally, an embodiment of the present invention can make use of software running on a computer or workstation. With reference to FIG. 7, such an implementation might employ, for example, a processor 702, a memory 704, and an input/output interface formed, for example, by a display 706 and a keyboard 708. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 702, memory 704, and input/output interface such as display 706 and keyboard 708 can be interconnected, for example, via bus 710 as part of a data processing unit 712. Suitable interconnections, for example via bus 710, can also be provided to a network interface 714, such as a network card, which can be provided to interface with a computer network, and to a media interface 716, such as a diskette or CD-ROM drive, which can be provided to interface with media 718.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 702 coupled directly or indirectly to memory elements 704 through a system bus 710. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 708, displays 706, pointing devices, and the like) can be coupled to the system either directly (such as via bus 710) or through intervening I/O controllers (omitted for clarity).

Network adapters such as network interface 714 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 712 as shown in FIG. 7) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 702. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
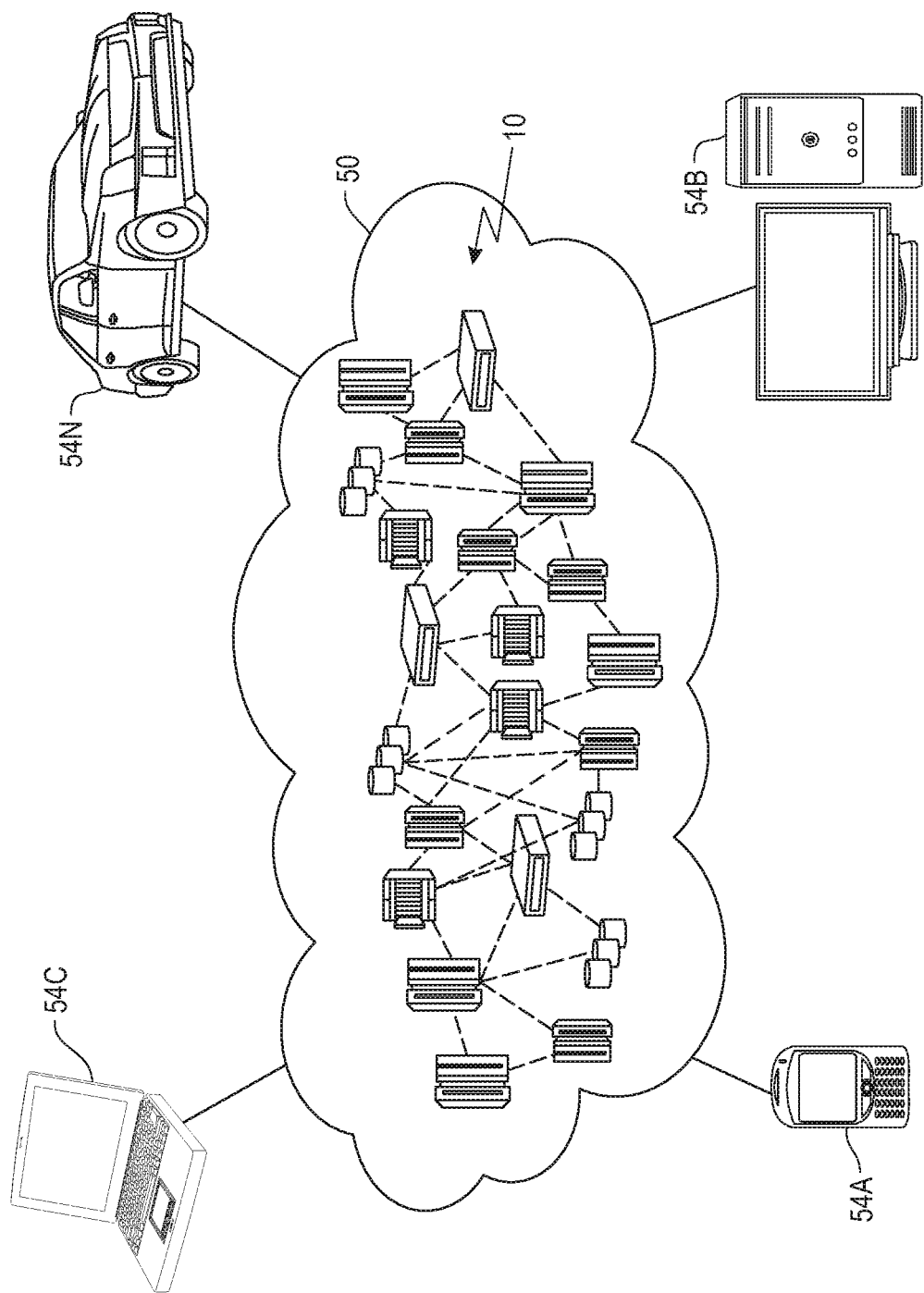
FIG. 8 depicts a cloud computing environment according to an embodiment of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
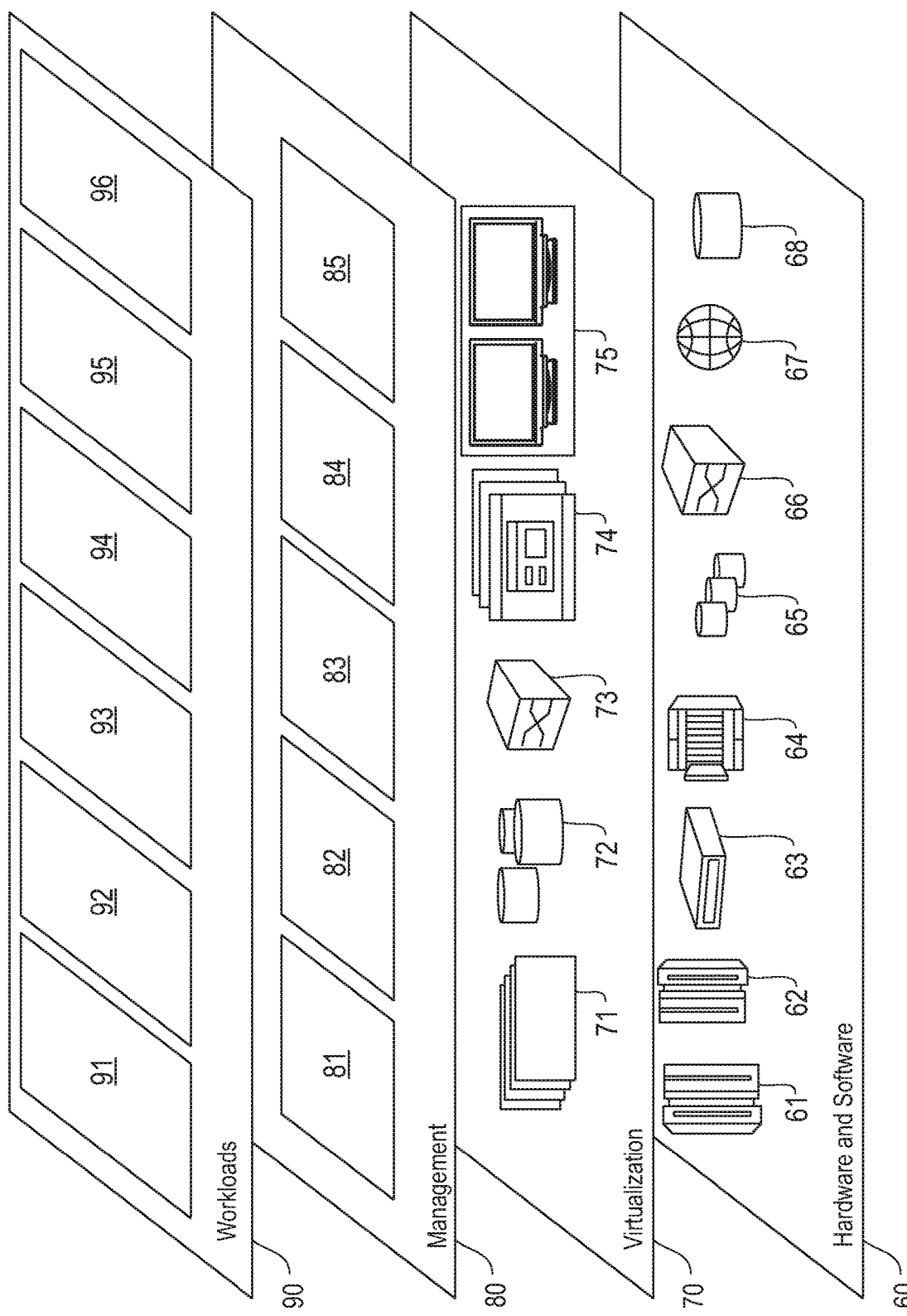
FIG. 9 depicts abstraction model layers according to an embodiment of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and contextual anomaly detection 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, rapid unsupervised anomaly comparison across multiple assets in a fleet to detect anomalies. Also, at least one embodiment of the present invention may provide a beneficial effect such as, for example, identifying temporal context anomalies by accounting for temporal continuity.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    obtaining time-series data frames corresponding to a plurality of assets;
    clustering the assets into one or more cohorts based on the time-series data frames, wherein each one of the cohorts comprises assets having statistically similar time-series data frames;
    for each given one of the assets within each one of the cohorts: (i) applying a time-context window to a portion of the time-series data frames corresponding to the given asset to generate at least one transformed data frame, and (ii) determining an asset distribution for the given asset based at least in part on said at least one transformed data frame;
    computing an isolation metric for each given one of the assets within at least one of the cohorts based on a corresponding asset distributions;
    determining that the at least one of the assets is anomalous in response to the computed isolation metric satisfying a predetermined threshold; and
    causing at least one remediation action to be performed based at least in part on said determining;
        wherein the method is carried out by at least one computing device.

2. The computer-implemented method of claim 1, wherein said clustering comprises applying an unsupervised clustering algorithm to the time-series data frames.

3. The computer-implemented method of claim 1, wherein said determining the asset distribution for the given asset comprises applying a sparse mixture of sparse Gaussians (SMSG) to the at least one transformed data frame for the given asset.

4. The computer-implemented method of claim 1, wherein said determining the asset distribution for the given asset comprises applying a Gaussian distribution to the transformed data frame for the given asset.

5. The computer-implemented method of claim 1, comprising:
    computing an isolation metric for each one of the cohorts based at least in part on the corresponding asset distributions; and
    determining that at least one of the cohorts is anomalous in response to the computed isolation metric satisfying a predetermined threshold.

6. The computer-implemented method of claim 5, wherein said determining that at least one of the cohorts is anomalous comprises:
    computing a Gaussian dictionary for each one of the cohorts, wherein each of the Gaussian dictionaries comprises the asset distributions of the assets corresponding to the cohort; and
    averaging all pairs of asset distributions between the assets distributions in the Gaussian dictionary corresponding to a first one of the cohorts and the asset distributions in the Gaussian dictionary corresponding to a second one of the cohorts.

7. The computer-implemented method of claim 1, wherein the time-series data frames comprise (i) timestamps and (ii) sensor values for the plurality of assets.

8. The computer-implemented method of claim 1, wherein the at least one remediation action comprises one or more of:
    outputting a list of the anomalous assets to a user;
    outputting a list of the anomalous cohorts to a user;
    disabling the at least on asset;
    resetting the at least one asset; and
    adjusting future data frames obtained from one or more of the anomalous assets and the anomalous cohorts.

9. The computer-implemented method of claim 1, wherein the plurality of assets comprise at least a part of one or more of: (i) a heating system, (ii) a ventilation system, (iii) a cooling system and (iv) a turbine system.

10. A computer program product comprising a computer readable storage medium having program instructions embodied therewith, the program instructions executable by a computing device to cause the computing device to:

obtain time-series data frames corresponding to a plurality of assets;
cluster the assets into one or more cohorts based on the time-series data frames, wherein each one of the cohorts comprises assets having statistically similar time-series data frames;
for each given one of the assets within each one of the cohorts: (i) apply a time-context window to a portion of the time-series data frames corresponding to the given asset to generate at least one transformed data frame, and (ii) determine an asset distribution for the given asset based at least in part on said at least one transformed data frame;
compute an isolation metric for each given one of the assets within at least one of the cohorts based on a corresponding asset distributions;
determine that the at least one of the assets is anomalous in response to the computed isolation metric satisfying a predetermined threshold; and
cause at least one remediation action to be performed based at least in part on said determining.

11. The computer program product of claim 10, wherein said clustering comprises applying an unsupervised clustering algorithm to the time-series data frames.

12. The computer program product of claim 10, wherein said determining the asset distribution for the given asset comprises applying a sparse mixture of sparse Gaussians (SMSG) to the at least one transformed data frame for the given asset.

13. The computer program product of claim 10, wherein said determining the asset distribution for the given asset comprises applying a Gaussian distribution to the transformed data frame for the given asset.

14. The computer program product of claim 10, wherein the computing device is caused to:
compute an isolation metric for each one of the cohorts based at least in part on the corresponding asset distributions; and
determine that at least one of the cohorts is anomalous in response to the computed isolation metric satisfying a predetermined threshold.

15. The computer program product of claim 14, wherein said determining that at least one of the cohorts is anomalous comprises:
computing a Gaussian dictionary for each one of the cohorts, wherein each of the Gaussian dictionaries comprises the asset distributions of the assets corresponding to the cohort; and
averaging all pairs of asset distributions between the assets distributions in the Gaussian dictionary corresponding to a first one of the cohorts and the asset distributions in the Gaussian dictionary corresponding to a second one of the cohorts.

16. The computer program product of claim 10, wherein the time-series data frames comprise (i) timestamps and (ii) sensor values for the plurality of assets.

17. A system comprising:
a memory; and
at least one processor operably coupled to the memory and configured for:
obtaining time-series data frames corresponding to a plurality of assets;
clustering the assets into one or more cohorts based on the time-series data frames, wherein each one of the cohorts comprises assets having statistically similar time-series data frames;
for each given one of the assets within each one of the cohorts: (i) applying a time-context window to a portion of the time-series data frames corresponding to the given asset to generate at least one transformed data frame, and (ii) determining an asset distribution for the given asset based at least in part on said at least one transformed data frame;
computing an isolation metric for each given one of the assets within at least one of the cohorts based on a corresponding asset distributions;
determining that the at least one of the assets is anomalous in response to the computed isolation metric satisfying a predetermined threshold; and
causing at least one remediation action to be performed based at least in part on said determining.

18. A computer-implemented method comprising:
obtaining time-series data frames corresponding to a plurality of assets;
clustering the assets into one or more cohorts based on the time-series data frames, wherein each one of the cohorts comprises assets having statistically similar time-series data frames;
for each given one of the assets within each one of the cohorts: (i) applying a time-context window to a portion of the time-series data frames corresponding to the given asset to generate at least one transformed data frame, and (ii) determining an asset distribution for the given asset based at least in part on said at least one transformed data frame;
computing an isolation metric for each one of the cohorts based at least in part on the determined asset distributions;
determining that at least one of the cohorts is anomalous in response to the computed isolation metric satisfying a predetermined threshold; and
causing at least one remediation action to be performed based at least in part on said determining;
wherein the method is carried out by at least one computing device.

19. The computer-implemented method of claim 18, wherein said clustering comprises applying an unsupervised clustering algorithm to the time-series data frames.

20. The computer-implemented method of claim 18, wherein said determining the asset distribution for the given asset comprises applying a sparse mixture of sparse Gaussians (SMSG) to the at least one transformed data frame for the given asset.

* * * * *